Patented Nov. 25, 1941

2,263,603

UNITED STATES PATENT OFFICE 2,263,603

METHOD OF FLAKING LEAD

Othon Adolf Ziehl, Union, N. J., assignor to Metals Disintegrating Company, Inc., Elizabeth, N. J., a corporation of New Jersey No Drawing. Application June 17, 1936, Serial No. 85,694

8 Claims. (Cl. 83—94)

This invention relates to an improved method of producing lead, tin and zinc metallic "bronze" paste or powder pigment for paints, etc., whereby the resulting products have superior leafing properties imparted to them, their color is improved, and the flaking out of the metal particles facilitated.

It is preferred to apply these improvements in a method of manufacture comprising an impact-ball-milling operation, wherein particles of convenient size are subjected to impact comminution by suitable media, such as steel balls; the metal particles being charged into the ball mill together with a liquid solvent such as varsol (formerly called "varnolene") carrying in probable solution a leafing agent such as stearic or palmitic acid, the whole charge forming a sludge. Following in general the directions of U. S. patent to Hall No. 2,002,891, including carrying out the milling operation at a temperature not greatly different from 50° C., the metal particles are flaked out and reduced to a size suitable for application as a paint pigment or for other similar uses, and simultaneously the property of leafing is imparted to the flakes. After this milling operation, the sludge is removed from the mill and ball charge as by a screening or centrifuging operation, or preferably by introducing an additional quantity of the liquid solvent to the mill and washing the diluted sludge from the mill and ball charge. In any case, if the sludge, so separated, contains an excessive amount of the solvent for the intended commercial application of the product—as is usually the case—the excess solvent is readily removed as by a filtering or centrifuging operation, etc., and the material brought to paste form. In case a dry flake powder is desired, the solvent may be completely removed under carefully controlled temperature conditions, without impairment of the leafing property; it being desirable to carry out such an operation in a vacuum or neutral atmosphere, although this precaution is not necessary providing the temperature is held sufficiently low.

The present invention is based on the discovery that in the processing of lead, tin and zinc metals by the method above referred to, the addition to the milling charge of carbon dioxide or sulfur dioxide, together with a smaller percentage of air, causes a distinct improvement in the leafing property of the resulting product, and, in addition, facilitates comminution of the metal particles to the desired size and flake structure. The mixture of carbon dioxide and air or sulfur dioxide and air can conveniently be made available to the mill charge where these substances form the atmosphere in the mill and/or are dissolved in the solvent used during milling.

While it is possible to add certain compounds containing available carbon dioxide or sulfur dioxide as a substitute for these gases in the mill atmosphere, it has been found more desirable to use the gases themselves, thus avoiding formation of secondary reaction compounds which would probably have to be removed from the resulting product for best results in subsequent application as a pigment, etc.

The exact function of the carbon dioxide or sulfur dioxide added with air to the mill is not known, although there is evidence that the use of these gases aids in development of leafing in some specific manner. Nitrogen or hydrogen gas used in the same proportions is not an equivalent substitute for carbon dioxide or sulfur dioxide. Also, it is necessary that air or oxygen be present with the carbon dioxide or sulfur dioxide if leafing is to be developed, and in the absence of oxygen the metal particles have a pronounced tendency toward "welding" together, resulting in a coarse, poorly flaked product.

During the flaking operation in the presence of an air and carbon dioxide atmosphere, measurable amounts of both oxygen and carbon dioxide are removed from the atmosphere, indicating the possibility that their function is of a definite chemical nature; and while the leafing agent (stearic acid, palmitic acid, etc.) undoubtedly is instrumental in the formation of the film on the surface of the flakes, which causes them to float or leaf, it appears that in some way the oxygen and carbon dioxide either facilitate formation of this film or in some manner modify the film so as to definitely improve the leafing property of the resulting product. Sulfur dioxide undoubtedly functions in a similar manner.

As stated above, the functions of the oxygen, of the dioxide, and of the stearic, whether considered severally or in their relations to each other, are not precisely known. On the basis of results, however, there seems to be no question but that there is a distinct advantage in employing all of them.

It may be, taking the case of lead, for example, and assuming that carbon dioxide is the gas utilized as part of the atmosphere of milling, that the free oxygen oxidizes the surface of the lead particles while the surface is being developed during the flattening or spreading of the lead particles due to milling, as evidenced by consumption of oxygen. The carbon dioxide probably reacts almost instantly with this oxide surface to form a carbonate as expressed by the general equation $PbO + CO_2 = PbCO_3$, though basic carbonates are not precluded. Such a surface would then permit dispersion of the metal particles throughout the vehicle (assuming that the wet milling process of the Hall patent above referred to is being used), and thus make the surface available to the leafing agent stearic acid, the latter reagent in turn probably reacting with the carbonate or basic carbonate surface to produce a leafing film. The dioxide may merely act as a catalyst, producing a temporary condition favorable to the introduction of the stearic acid as leafing agent; or its presence may result in definite permanent combination with the metal and/or leafing agent. The view is favored that carbon dioxide enters permanently into the leafing film together with oxygen and stearic acid, and that the compound or compounds on the metal surface have a structure analogous to that of basic lead carbonate, the general structure of which is supposed to be:

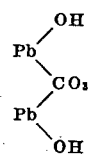

that is, for the leafing film the possible structure:

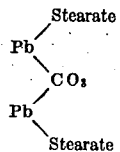

or a variation thereof.

In the case where sulfur dioxide is substituted for the carbon dioxide in the treatment of lead, or where zinc or tin are treated by the instant process, whether with carbon dioxide or sulfur dioxide, there are undoubtedly chemical effects that improve the leafing quality of the product-effects due to the use of the three agents, oxygen, stearic acid (or equivalent so-called "leafing agent") and carbon or sulfur dioxide, with the dioxide in amount many times that of the oxygen.

It is at the same time true that addition of either carbon dioxide or sulfur dioxide aids materially in the mechanical flaking out of the metal particles, probably due to formation of a better leafing film. This leafing film being of a greasy nature serves as a lubricant on the surface of the flakes and as such facilitates stretching out of the metal into flakes under impact of the falling balls without "tearing" of the flakes to produce excessive amounts of slimes which have a deleterious effect on brilliance of the metal flakes; and in addition, this greasy film prevents "welding" of the metal particles to each other under impact. Due to formation of a more effective leafing film on the surfaces of these metals through employment of carbon dioxide or sulfur dioxide with air or oxygen, these gases at the same time provide a more effective lubricant on the surfaces of the metal flakes during grinding and allow a somewhat harder and more effective impact flaking operation to be employed than would otherwise be possible.

The preferred atmosphere for operation according to this improved process is one containing approximately 20% air and 80% carbon dioxide which would analyze about 4% oxygen, 16% nitrogen and 80% $CO_2$. It has been found that an atmosphere containing 4% oxygen and 96% carbon dioxide will give a good leafing product although the 20% air, 80% carbon dioxide combination is, of course, more practical.

Tests indicate that about 4% oxygen is best for the atmosphere, the balance of the atmosphere consisting of carbon dioxide or a mixture of carbon dioxide and nitrogen. Nitrogen is of course only a "diluent" and could undoubtedly be replaced by numerouse other gases with no harmful effect; however, there would be no practical reason for making such a substitution. Carbon dioxide is preferably kept between the limits of 50% to 80%. Preferably the oxygen content is around 4%, and the balance of the atmosphere is carbon dioxide (or its equivalent) within the indicated proportion, plus such a diluent as nitrogen. All percentages are based on volumes of the gases.

It has also been found that this carbon-dioxide-air atmosphere has the same beneficial effect in "dry" flaking of lead. With this atmosphere, it is possible to make a leafing lead flake in a ball mill with stearic acid as the addition agent and without a liquid medium, e. g., in the neighborhood of 2% of stearic acid on the weight of lead; whereas, in an air atmosphere, under the same conditions, leafing does not develop to any appreciable extent. As in the case of flaking in varsol-plus-stearic-acid, sulfur dioxide can be substituted for carbon dioxide in about the same proportions, in either the dry or wet (varsol-plus-stearic acid) process carbon dioxide is somewhat more effective than sulfur dioxide.

Where a paste product has been made, as by "wet" (varsol-plus-stearic-acid) process, this may be dried to obtain a powder, in the case of lead, zinc or tin without appreciable loss of leafing properties at temperatures of about 120 degrees F. in an air atmosphere, and at slightly higher temperatures in a high vacuum or in an inert atmosphere. In a high vacuum or inert atmosphere (such as nitrogen), zinc can be dried at temperatures as high as 200 degrees F., although for lead and tin a lower temperature is advisable.

For lead and tin mill temperatures of about 70 to 100 degrees F. are satisfactory, while for zinc best results are obtained at about 140 degrees F.

I claim:

1. The method which consists in subjecting lead particles to a ball milling operation in a vehicle comprising mineral spirits and a leafing agent, and carrying out such milling operation in an atmosphere that includes about 4% of oxygen and from 50 to 80% carbon dioxide, the remainder of the atmosphere being a diluent such as nitrogen, the dioxide being soluble in the vehicle, and the oxygen, the dioxide and the leafing agent being selected and in proportions for their effective consumption and utilization in the production of leafing flake, substantially as set forth.

2. The method which consists in subjecting lead particles to a ball milling operation with a leafing agent, and carrying out the milling operation in an atmosphere that includes about 4% of oxygen and from 50 to 80% carbon dioxide, the remainder of the atmosphere being a diluent such as nitrogen, the oxygen, the dioxide and the leafing agent being selected and in proportions for their effective consumption and utilization in the production of leafing flake, substantially as set forth.

3. In the production of leafing lead powder or paste, the method which consists in subjecting a mixture of lead particles and a leafing agent to a wet flaking operation in an atmosphere including substantial amounts of free oxygen and a gas selected from the group consisting of carbon dioxide and sulphur dioxide, the dioxide content of said atmosphere being in amount many times that of the oxygen content and constituting the major portion of said atmosphere, the leafing agent, the oxygen and the dioxide being selected and in proportions for their effective consumption and utilization in the production of leafing flake, substantially as set forth.

4. In the production of leafing zinc powder or paste, the method which consists in subjecting a mixture of zinc particles and a leafing agent to a wet flaking operation in an atmosphere including substantial amounts of free oxygen and a gas selected from the group consisting of carbon dioxide and sulphur dioxide, the dioxide content of said atmosphere being in amount many times that of the oxygen content and constituting the major portion of said atmosphere, the leafing agent, the oxygen and the dioxide being selected and in proportions for their effective consumption and utilization in the production of leafing flake, substantially as set forth.

5. In the production of leafing tin powder or paste, the method which consists in subjecting a mixture of tin particles and a leafing agent to a wet flaking operation in an atmosphere including substantial amounts of free oxygen and a gas selected from the group consisting of carbon dioxide and sulphur dioxide, the dioxide content of said atmosphere being in amount many times that of the oxygen content and constituting the major portion of said atmosphere, the leafing agent, the oxygen and the dioxide being selected and in proportions for their effective consumption and utilization in the production of leafing flake, substantially as set forth.

6. In the production of leafing lead powder or paste, the method which consists in subjecting lead particles to a wet flaking operation in the presence of a leafing agent in an atmosphere including a relatively small proportion of oxygen and a relatively large proportion of a gas selected from a group consisting of carbon dioxide and sulphur dioxide, the dioxide content of said atmosphere being in amount many times that of the oxygen content and constituting the major portion of said atmosphere, the leafing agent, the oxygen and the dioxide being selected and in proportions for their effective consumption and utilization in the production of leafing flake, substantially as set forth.

7. In the production of leafing lead powder or paste, the method which consists in subjecting a slurry of lead particles in a mineral thinner containing as a leafing agent a saturated fatty acid of high molecular weight to a flaking operation in an atmosphere including free oxygen and a gas selected from the group consisting of carbon dioxide and sulphur dioxide, while maintaining a temperature of about 50° C., the dioxide content of said atmosphere being in amount many times that of the oxygen content and constituting the major portion of said atmosphere, the leafing agent, the oxygen, and the dioxide being selected and in proportions for their effective consumption and utilization in the production of a leafing flake, substantially as set forth.

8. The method which consists in providing a quantity of particles of a metal selected from the group consisting of lead, tin, and zinc, and subjecting the particles to a flaking operation in the presence of a leafing agent in an atmosphere including free oxygen and a gas selected from the group consisting of carbon dioxide and sulphur dioxide, the dioxide content of said atmosphere being in amount many times that of the oxygen content and constituting the major portion of said atmosphere, the leafing agent, the oxygen, and the dioxide being selected and in proportions for their effective consumption and utilization in the production of leafing flake, substantially as set forth.

OTHON A. ZIEHL.